(12) United States Patent
Notten et al.

(10) Patent No.: US 6,346,343 B1
(45) Date of Patent: Feb. 12, 2002

(54) SECONDARY LITHIUM BATTERY COMPRISING LITHIUM DEPOSITED ON NEGATIVE ELECTRODE MATERIAL

(75) Inventors: Petrus H. L. Notten; Hans Feil, both of Eindhoven (NL); Francois P. R. Orsini, Anthony; Jean M. Tarascon, Amiens, both of (FR)

(73) Assignee: U.S. Philips Corporation, New York, NY (US)

( * ) Notice: Subject to any disclaimer, the term of this patent is extended or adjusted under 35 U.S.C. 154(b) by 37 days.

(21) Appl. No.: 09/603,932

(22) Filed: Jun. 27, 2000

(30) Foreign Application Priority Data

Nov. 11, 1999 (EP) .............................. 99203772

(51) Int. Cl.$^7$ ............................................ H01M 10/40
(52) U.S. Cl. .................................. 429/60; 429/231.95
(58) Field of Search ..................... 429/60, 231.1–231.9, 429/231.95

(56) References Cited

U.S. PATENT DOCUMENTS

| 4,497,883 A | * | 2/1985 | Murray |
| 5,464,705 A | * | 11/1995 | Wainwright |
| 5,514,488 A | * | 5/1996 | Hake et al. |
| 5,552,239 A | | 9/1996 | Gozdz et al. ................. 429/94 |
| 5,569,520 A | * | 10/1996 | Bates |
| 5,636,437 A | * | 6/1997 | Kaschmitter et l. |

FOREIGN PATENT DOCUMENTS

| JP | 2000106217 A | * | 4/2000 |
| WO | WO97/33327 | * | 9/1997 |

* cited by examiner

Primary Examiner—Gabrielle Brouillette
Assistant Examiner—Susy Tsang
(74) Attorney, Agent, or Firm—Dicran Halajian

(57) ABSTRACT

A description is given of a secondary lithium metal battery in which the formation of lithium dendrites is inhibited. The battery (1) comprises negative electrode material (3) on a current collector (5) and positive electrode material (7) on a current collector (9) separated by a separator (11), which may be a polymer gel electrolyte optionally combined with a separator. According to the invention, the negative electrode (anode) has a high specific surface area, so that lithium dendrites are prevented during charging of the negative electrode. Examples of electrode materials of high surface area are particles of graphite, metals such as nickel, or metal foams, e.g. of nickel. Lithium intercalation does not occur in metals, whereas the intercalating capacity for lithium in graphite is at most 25 percent of the capacity of the positive electrode.

9 Claims, 2 Drawing Sheets

SECONDARY LITHIUM BATTERY COMPRISING LITHIUM DEPOSITED ON NEGATIVE ELECTRODE MATERIAL

BACKGROUND OF THE INVENTION

The invention relates to a secondary lithium battery comprising a negative electrode having negative electrode material with a porous structure of electroconductive material, a positive electrode having positive electrode material capable of intercalating lithium, and a non-aqueous ion-conductive medium between the negative and the positive electrode.

The need for high-energy density secondary (i.e. rechargeable) batteries is increasing, due to a growing market for lightweight, portable cordless consumer products, e.g. CD-players, mobile telephones, laptop computers and video cameras. For acceptable portability, these batteries should contain the necessary amount of energy at the smallest possible weight and volume. The present rechargeable batteries on the market, e.g. nickel-cadmium (NiCd) and nickel-metalhydride (NiMH), do not meet all these requirements. Moreover, the use of cadmium as the negative electrode material should be avoided for environmental reasons.

A very interesting material for use in batteries is lithium. Lithium is the lightest of all metals, which promises an extremely high theoretical energy density of metallic lithium. Lithium is a leading contender in the field of a battery negative electrode materials, since it has a large negative thermodynamic potential. The use of lithium has no negative environmental consequences. Therefore, rechargeable lithium batteries are very promising, especially when weight is an important factor.

A rechargeable lithium battery consists of a positive (cathode) and a negative electrode (anode) separated by, for example, a porous polymeric film to prevent direct electrical contact in an organic electrolyte. A lithium transition metal oxide can be used as the positive electrode, and metallic lithium as the negative electrode. The electrolyte is for example, a lithium salt in a non-aqueous organic solvent with good ionic conductivity and negligible electronic conductivity. During charging, lithium ions are transported from the positive electrode towards the negative (lithium) electrode. During discharging, the lithium ions are transported in the reverse direction and inserted back into the positive electrode.

A battery using lithium metal foil or sheet for the negative electrode is called a lithium metal battery. Such a battery encounters the problem of short-circuits in the battery caused by a repetition of the charge/discharge cycles. Repetition of charge/discharge cycles leads to a repetition of the dissolution and precipitation of lithium metal, and dendrites of lithium metal can grow on the surface of the negative electrode. The growing dendrite will penetrate through the separator between the negative and the positive electrode and come into contact with the positive electrode, resulting in a short-circuit.

An alternative approach for rechargeable batteries consists in replacing a negative electrode foil or sheet of lithium metal with a lithium intercalating compound. Such a battery is known from U.S. Pat. No. 5,552,239. Another lithium intercalating compound is used as a positive electrode, which leads to a rechargeable battery free from lithium metal; a so called Li-ion battery. In commercial Li-ion batteries, the positive electrode is generally composed of $Li_xCoO_2$, in which x varies between 0.5 and 1, and the negative electrode is made of graphite ($Li_yC_6$), wherein y ranges between 0 and 1. During charging, lithium ions deintercalate from the positive electrode and move into the non-aqueous electrolyte. The negative electrode then intercalates these ions. During discharging the process is reversed. Both electrodes exhibit the so-called intercalation reaction, also known as the host-guest reaction. It does not involve an electrolyte concentration change, nor any dissolution of the active materials into the electrolyte. Therefore, Li-ion batteries sometimes bear the name "rocking-chair batteries". Carbon materials are good hosts for use as a negative electrode because they are able to intercalate and deintercalate lithium ions during charging and discharging of the battery, respectively. The growth of dendrites is prevented in such a negative electrode of carbon, and the problem of a short-circuit in the battery is solved.

A disadvantage of the use of host materials is the significant reduction of the energy density of these batteries. At the upper limit, 1 lithium atom per 6 carbon atoms can be intercalated, which amounts to a theoretical capacity of only 372 mAh/(g carbon), whereas a lithium metal electrode has a capacity of 3860 mAh/g.

SUMMARY OF THE INVENTION

It is an object of the invention to provide, inter alia, a lithium metal secondary battery in which the growth of lithium dendrites on the negative electrode is inhibited during charging of t he battery.

According to the invention, this object is achieved in a battery as specified in the opening paragraph, characterized in that the intercalating capacity for lithium of the negative electrode is at most 25 per cent of the capacity of the positive electrode material. The invention is based on the insight that the formation of lithium dendrites during charging is inhibited by the use of low current density. This can be achieved by offering a negative electrode material which has a high specific surface area (in $m^2/g$), such as in the cited U.S. Pat. No. 5,552,239. But at the same time the volume or mass of the negative electrode material should be low, so that the amount of lithium that is intercalated during charging is as low as possible. Surprisingly, it has been found that the amount of lithium that cannot be intercalated in the negative electrode material having a high specific surface area is deposited on that material as a smooth lithium metal layer, without the formation of dendrites. As a result, the battery obtained is a lithium metal battery.

In practical batteries the capacity C (in mAh) of the negative electrode is equal to the capacity of the positive electrode (which is also the capacity of the battery). The capacity of the negative electrode can be expressed as:

$$C_{neg} = C_{Li\ intercal} + C_{Li\ metal} = C_{pos}, \quad (1)$$

or in other words: the total capacity of the negative electrode is equal to the sum of the amount of lithium that is intercalated (intercalating capacity) and the amount of lithium that is deposited as metal layer. According to the invention, the intercalating capacity for lithium $C_{Li\ intercal}$ is at most 25 per cent of the capacity of the positive electrode:

$$C_{Li\ intercal} \leq 0.25 C_{pos} \quad (2)$$

As mentioned above, the current density at the negative electrode during charging should be as low as possible in order to prevent the growth of lithium dendrites. As the current $I_{neg}$ through the negative electrode is equal to the current $I_{pos}$ through the positive electrode during (dis)

charging, the current densities i (in A/m²) are preferable chosen such that the following relationship applies:

$$i_{neg} \leq i_{pos} \quad (3)$$

A high surface area of the negative electrode can be achieved by using a porous structure of, for example, small particles of electroconductive material for the negative electrode material. If spherical particles are used, the diameter of the particles to be used depends on the densities and masses of the negative and positive electrode materials according to the relationship:

$$d_{neg}\delta_{neg}m_{pos} \leq d_{pos}\delta_{pos}m_{neg}, \quad (4)$$

wherein m is the mass of the electrode materials (in g), δ is the density of the electrode materials (in g/m³), and d is the diameter of the particles (in m) of the electrode materials.

Preferably, the intercalation capacity for lithium in the negative electrode material is at most 10 percent of the capacity of the positive electrode, or more preferably, intercalation is even absent.

If particles are used for the negative electrode material, electroconductive particles can be chosen, such as particles of metal or carbonaceous material. Carbonaceous materials include petroleum coke, coal coke, acetylene black, furnace black, ketjen black, carbon black and graphite. Graphite is especially favorable because an extremely smooth lithium deposit is created during charging. Nickel is a preferred metal for metallic particles because this metal has a good electroconductivity, is cheap, and intercalation of lithium is negligibly small.

In a preferred embodiment, the average diameter of the electroconductive particles is less than 1 μm, in order to satisfy the above-mentioned formula (4).

Another class of negative electrode materials which can be suitably used in a battery according to the invention is a commercially available metal foam (sponge metal) of, for example nickel. Such a foam shows a high porosity, i.e. a large surface area.

The positive electrode material is a lithium intercalation compound, such as LiMn$_2$O$_4$, LiCoO$_2$ or LiNiO$_2$ dispersed in a polymeric binder matrix. Preferably, the mixture also comprises a powdery conductive material, such as carbon black (acetylene black, thermal black for example), graphite powder, metal powder or the like. The amount of conductive material is in the range of 2 to 15% by weight.

Matrix polymers are used for the binder, which include polysaccharide, thermoplastic polymers and polymers having rubber-like elasticity. Examples include carboxymethyl cellulose, polytetrafluoroethylene, polyvinylidene fluoride, hexafluoropropylene, polyethylene, polypropylene and styrene-butadiene rubber. The polymers may be used singly or in combination. The polymeric binder serves to bind active material powders together to prevent cracks and to fix such powdery materials to the surface of the current collector. The amount of the polymeric binder is in the range of 2 to 30% by weight.

If particulate electrode material is used, a current collector is employed. The current collector serves to effectively transmit electrons upon charging and discharging. Preferably, the current collector is a metal foil or metal mesh onto which the electrode material is applied. Any electronic conductor may be used for the current collector provided it does not induce chemical reactions in the battery. Examples of materials for the positive current collector (cathode) include stainless steel and aluminum. Examples of materials for the negative current collector (anode) include stainless steel, copper and nickel. The collector may be in the shape of a foil, film or sheet, and may be porous, punched or mesh-like. The thickness of the collector generally is in the range of 1 to 500 μm.

The electrode materials can be made by mixing negative or positive active particulate material, conductive material, and binder material, which are all in the form of powder in a wet process in which an organic solvent is used.

The paste-like mixture obtained is then coated onto the current collector, dried and compressed. For this purpose, one of the following coating methods can generally be employed: screen printing, roller coating, doctor blade coating, knife coating, extrusion coating, bar coating, dip coating and squeeze coating. The thickness of the coated layer, which is compressed after drying, generally is in the range of 1 to 1000 μm.

The separator provided between the positive and negative electrode is an insulating film or foil having both a high ion permeability and a desired mechanical strength. It prevents short-circuits between the negative and the positive electrode and retains the electrolytic solution. A widely used separator is made of glass fiber or a porous sheet or non-woven fabric made of olefinic polymers such as polyethylene or polypropylene. The polymer may be the same as used for the binder for the electrode material. The diameter of the pores generally is in the range of 0.01 to 10 μm. The thickness of the separator generally is in the range of 5 to 300 μm. If a polymer gel electrolyte is used in the battery (lithium polymer battery), this polymer gel may act as a separator, so that a separate separator foil is not necessary. The polymer gel electrolyte may also be combined with a separate separator film or foil.

The battery structure of the present invention may be activated with any of the numerous liquid electrolyte solutions which act as an ion conductive medium. An ester, such as ethylene carbonate, propylene carbonate, methylethylcarbonate; an ether, such as tetrahydrofurane; dimethyl sulfoxide, and mixtures thereof may be used for the solvent. Examples of the solute include salts composed of lithium ions (Li$^+$) and Lewis acid ions (BF$_4^-$, PF$_6^-$, AsF$_6^-$, ClO$_4^-$, CF$_3$SO$_3^-$) and mixed salts thereof. The concentration of the salt is between 0.5 and 2 mole/l. Alternatively, a solid ion conductive electrolyte may be used, such as a polymer (gel)-type electrolyte, which, as stated before, in addition acts as an electronic separator between the positive and the negative electrode.

Preferably, the battery according to the invention is a laminate comprising both the electrodes and the separator, forming a layered cell structure.

The battery may be in the form of a flat flexible sheet-like product or it may be folded in zig-zag fashion, or wound into a cylindrical or rectangular prismatic shape. The battery may be of the single-layer or multi-layer type. The flat battery structure may be die-punched into coins for use in the familiar button batteries.

Batteries of various size, capacity, and voltage range can be obtained from the layered cell structure by overlaying a number of cells or manifolding a single cell of extended dimension. Batteries of higher capacity can be constructed by repeating the sequences of cell elements. The voltage output of a battery may be increased by series multiplexing of a plurality of the basic laminate of the layered cell structure; in that case, the negative electrode layer of the first cell structure is placed in electrical contact with the positive electrode layer of a second similar cell structure. In these embodiments the battery comprises a multilayer stack of layers of a negative electrode, a separator and a positive electrode.

The battery is enclosed in a battery case, which may be a plastic, metallic or a plastic resin case. Examples of these materials include stainless steel and plastics like polypropylene. The sealing may be made by an adhesive, by welding, or soldering. A flat flexible battery may be enclosed in an air tight and moisture-proof bag of polymer-coated aluminium foil.

The non-aqueous secondary battery of the invention can be used in various (cordless) applications, for example, notebook personal computers, portable CD-players, portable telephones, paging equipment, video cameras, electric shavers, electric tools, and hearing aids. Large scale applications are possible in HEV (hybrid electrical vehicle) and FEV (full electrical vehicle).

BRIEF DESCRIPTION OF THE DRAWINGS

The invention will be elucidated in greater detail by means of exemplary embodiments and with reference to the accompanying drawings, in which.

DETAILED DESCRIPTION OF THE PREFERRED EMBODIMENTS

Exemplary Embodiment 1 (Graphite Negative Electrode)

A negative electrode is prepared by the method as described in the cited U.S. Pat. No. 5,552,239. A mixture is prepared by mixing 6.5 parts by weight of commercial microcrystalline graphite particles having a particle size of about 5 $\mu$m, 1 part polyvinylidene (PVdF) as a binder, 2.2 parts dibutyl phtalate as a plasticizer, 0.3 parts carbon black as a conductive material, 28 parts acetone, and is formed into a paste to be applied as a coating onto a glass plate. After drying and stripping from the glass plate, a square negative electrode of 1.5×1.5 cm is cut having a high specific surface area. The thickness of this graphite electrode is about 70 $\mu$m. The total amount of graphite in this electrode is 47.5 mg.

The composite graphite electrode is laminated with a copper grid which acts as a current collector. The other side of the graphite electrode is laminated with a porous PVdF membrane with a thickness of 85 $\mu$m which acts as a separator. The lamination temperature is about 120° C. during the formation of a negative electrode subassembly.

A positive electrode is prepared by the method as described in the cited U.S. Pat. No. 5,552,239. A mixture is prepared by mixing 10.5 parts by weight of $LiMn_2O_4$ having a particle size of less than 53 $\mu$m, 1.6 parts polyvinylidene (PVdF) as a binder, 1.6 parts dibutyl phtalate (DBP) as a plasticizer, 0.5 parts carbon black as a conductive material, 16 parts acetone, and is formed into a paste to be applied as a coating onto a glass plate. After drying and stripping from the glass plate, a square positive electrode is cut of 1.5×1.5 cm. The thickness of this positive electrode is about 100 m. The total amount of $LiMn_2O_4$ in this electrode is 10.5 mg.

The composite positive electrode is laminated with an open mesh aluminium grid as a current collector. The lamination temperature is about 120° C. while a positive electrode subassembly is being formed.

Figure 1:
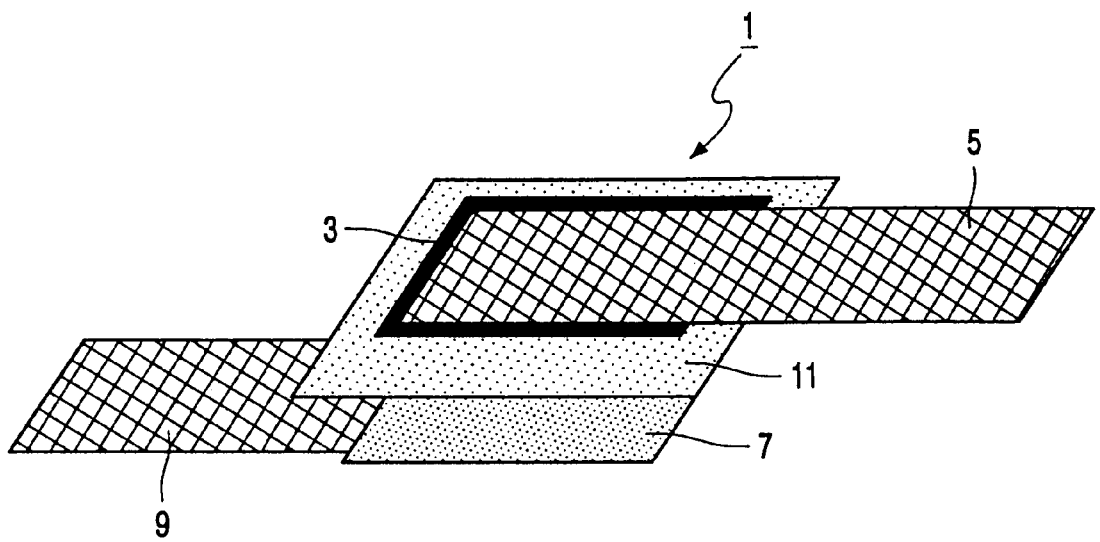
FIG. 1 is a diagrammatic oblique view of the layered structure of a typical battery in accordance with the invention.

The electrode subassemblies, including the separator, are assembled into a layered structure of a battery. FIG. 1 is a diagrammatic oblique view of a battery 1 according to the invention. This Figure shows the negative electrode material 3 based on graphite on the copper grid 5. The positive electrode material 7 on the aluminium grid 9 is electrically separated from the negative electrode material 3 by the separator 11.

The resulting battery structure 1 is then immersed in diethyl ether several times in order to remove the plasticizer DBP by extraction.

After drying, the battery is activated for charge/discharge cycling by immersion in a 1 mole/l electrolyte solution of $LiPF_6$ in 50:50 ethylene carbonate (EC):dimethyl carbonate (DMC).

The negative electrode is galvanostatically lithiated by applying a current of 5 mA corresponding to a geometrical current density of 2.2 $mA/cm^2$. For a lithiation time of 4 hours, no dendritic lithium deposit is observed on the graphite particles by scanning electron microscopy. The amount of deposited lithium reaches a level of more than 3.75 Li atoms per C atom, which means a Li excess quantity of about 2.75 in relation to the stoichiometric compound $LiC_6$. The graphite particles appear very smooth and are covered by a homogeneous lithium deposit. This proves that overlithiation does not lead to dendritic lithium deposits, because the high specific surface area of the graphite particles induces real current densities at the negative electrode which are about 180 times lower than the geometric current densities.

Figure 2:
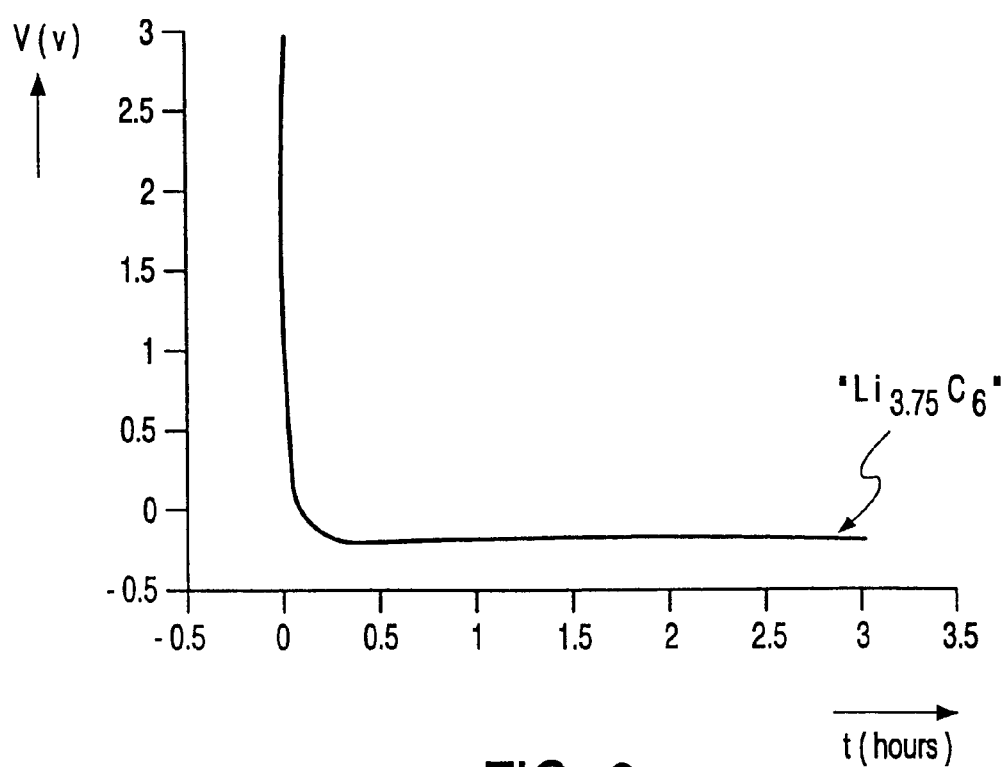
FIG. 2 shows the voltage V (in volts) of the negative electrode based on graphite particles versus the charging time t (in hours) at a geometric current density of 2.2 $mA/cm^2$.

FIG. 2 plots the voltage V (in volts) of the negative electrode (relative to a lithium reference electrode) against the charging time t (in hours) at a current of 5 mA. Within the first few minutes, the voltage drops sharply to zero, indicating that the graphite particles are completely lithiated to the stoichiometric compound $LiC_6$, and lithium metal is formed on the particles. During the rest of the charging, the voltage remains substantially constant and approximately zero, and the graphite particles are covered by a smooth lithium deposit. In the present case the intercalating capacity for lithium of the negative electrode is about 3 percent of the total capacity of the negative electrode, or according to equation (2), about 3 percent of the capacity of the positive electrode.

A lithium electrode based on graphite of a known battery would show a slow decay in voltage over time, i.e. a sharp decay to zero voltage is absent, because the amount of graphite (mass or volume), and therefore the intercalating capacity, is much higher and about equal to the amount and the capacity of the positive electrode material. In that case the amount of graphite would be sufficient to store all lithium by intercalation to $LiC_6$ during charging, so that overlithiation would not occur.

Exemplary Embodiment 2 (Nickel Negative Electrode)

Exemplary embodiment 1 is repeated, except in that nickel particles are used instead of graphite particles as the negative electrode material, which nickel particles are prepared by the polyol process as described in an article by F.Fievet et al, MRS Bulletin (December 1989) 29. The fine nickel particles have a high specific surface area of 3.29 $m^2/g$. A mixture is prepared by mixing 7 parts by weight of these nickel particles having a particle size of about 1 $\mu$m, 1 part polyvinylidene (PVdF) as a binder, 1.7 parts dibutyl phtalate as a plasticizer, 0.2 parts carbon black as a conductive material, 28 parts acetone, and is formed into a paste to be applied as a coating onto a glass plate. The subsequent battery manufacture is the same as described for embodiment 1.

Upon charging at a geometrical current density of 2.2 mA/cm$^2$, a similar voltage-time curve is obtained as in FIG. 2. Intercalation does not occur in nickel. No lithium dendrites are observed, but a smooth lithium deposition on the nickel particles is obtained.

Figure 3:
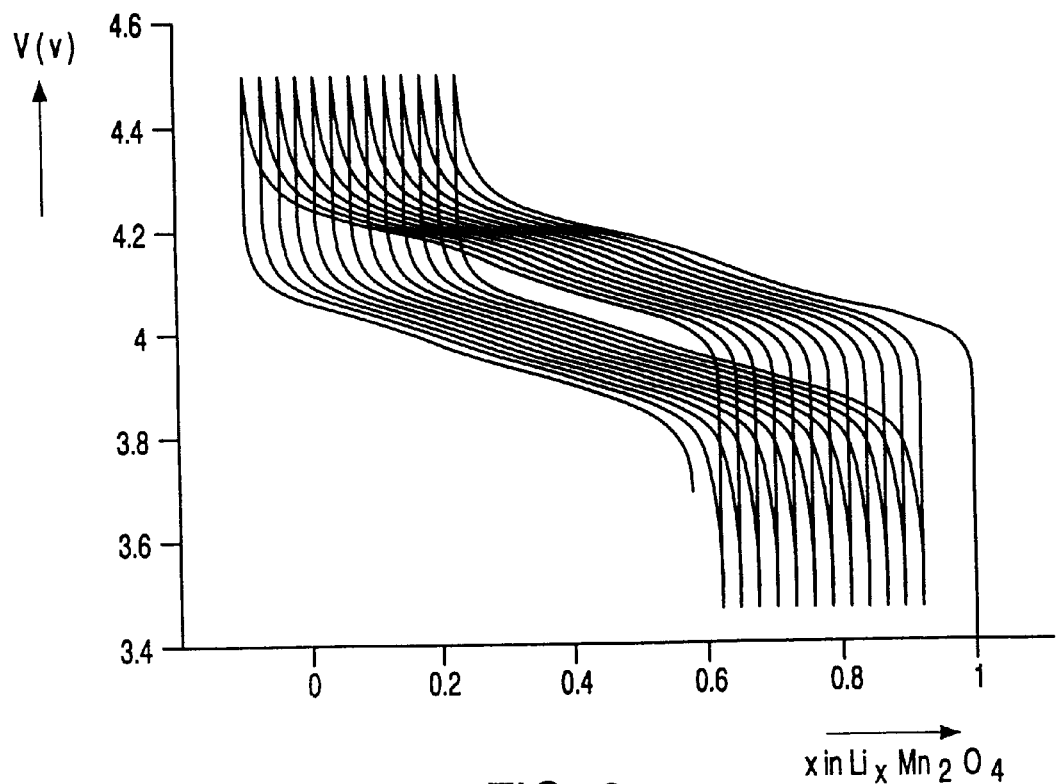
FIG. 3 shows a graph of charge/discharge cycle performance of a typical battery in accordance with the invention.

FIG. 3 shows the results of a series of charge/discharge cycles measured with a geometrical current density of 0.45 mA/cm$^2$. In this graph, the cell voltage V (in volts) is plotted against the mole fraction x of lithium in the positive electrode material Li$_x$Mn$_2$O$_4$.

Exemplary Embodiment 3 (Sponge Nickel Negative Electrode)

Exemplary embodiment 1 is repeated with a high porosity nickel foam (manufacturer Nitech) as the negative electrode.

Figure 4:
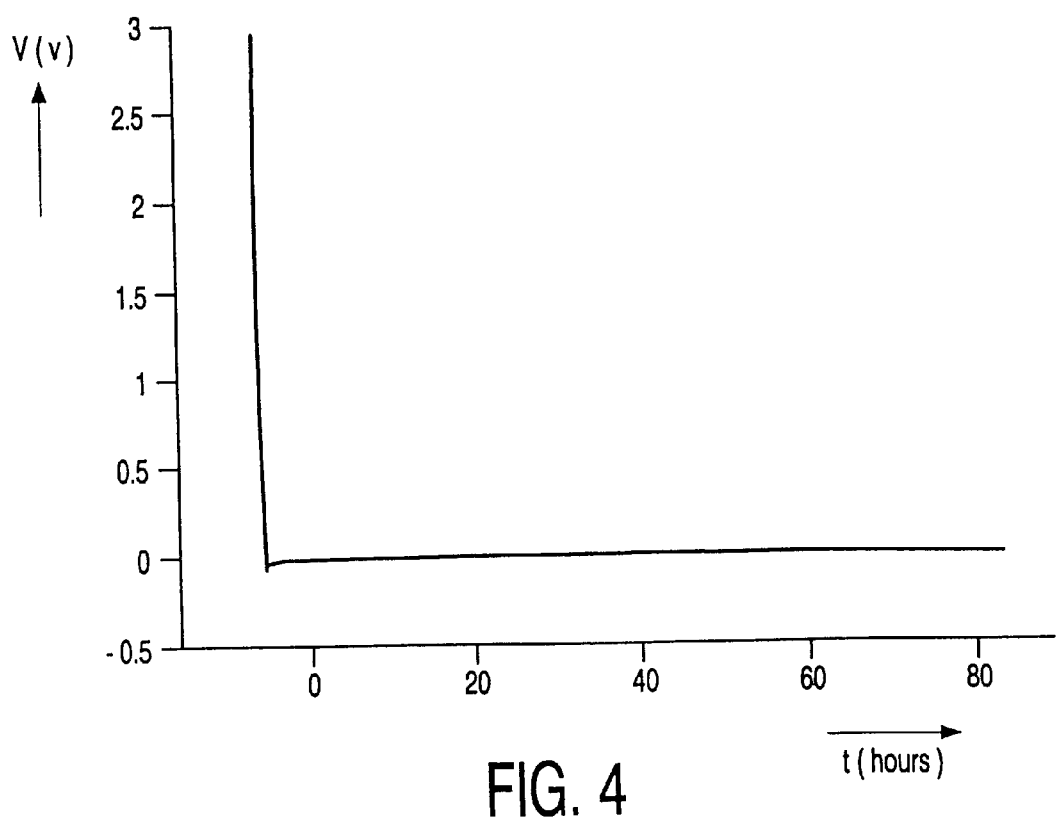
FIG. 4 shows the voltage V (in volts) of the negative electrode of nickel foam versus the charging time t (in hours) at a geometric current density of 0.45 $mA/cm^2$.

FIG. 4 plots the voltage V (in volts) of the negative electrode (relative to a lithium reference electrode) against the charging time t (in hours) with a current of 1 mA. The geometrical current density is 0.45 mA/cm2. Upon charging, the voltage drops immediately to zero. During the rest of the charging, the voltage remains substantially constant and approximately zero, and the nickel foam is covered by a smooth lithium deposit in the pores. No lithium dendrites are observed.

According to the invention, a lithium metal secondary battery is provided which has a negative electrode material with high surface area. This material is porous and is formed by, for example, particulate material or foam material. Due to the high surface area, the current density during charging of the negative electrode remains low and the formation of lithium dendrites is prevented.

What is claimed is:

1. A secondary lithium battery comprising a negative electrode having negative electrode material with a porous structure of electroconductive material, a positive electrode having positive electrode material capable of intercalating lithium, and a non-aqueous ion conductive medium between the negative and the positive electrode, wherein the intercalating capacity for lithium of the negative electrode is at most 25 per cent of the capacity of the positive electrode material.

2. A secondary lithium battery as claimed in claim 1, wherein the intercalating capacity for lithium of the negative electrode is at most 10 per cent of the capacity of the positive electrode material.

3. A secondary lithium battery as claimed in claim 1, wherein the negative electrode material comprises particles of electroconductive material.

4. A secondary lithium battery as claimed in claim 3, wherein the negative electrode material comprises particles of carbonaceous material.

5. A secondary lithium battery as claimed in claim 4, wherein the carbonaceous material is graphite.

6. A secondary lithium battery as claimed in claim 3, wherein the negative electrode material comprises particles of nickel.

7. A secondary lithium battery as claimed in claim 3, wherein the average diameter of the particles is less than 1 μm.

8. A secondary lithium battery as claimed in claim 1, wherein the negative electrode material comprises a metal foam.

9. A secondary lithium battery as claimed in claim 8, wherein the metal of the foam is nickel.

\* \* \* \* \*